United States Patent
Wong et al.

(10) Patent No.: US 12,200,643 B2
(45) Date of Patent: Jan. 14, 2025

(54) METHODS, INFRASTRUCTURE EQUIPMENT AND COMMUNICATIONS DEVICE

(71) Applicant: Sony Group Corporation, Tokyo (JP)

(72) Inventors: Shin Horng Wong, Basingstoke (GB); Martin Warwick Beale, Basingstoke (GB); Basuki Priyanto, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 662 days.

(21) Appl. No.: 17/433,608

(22) PCT Filed: Feb. 6, 2020

(86) PCT No.: PCT/EP2020/052986
§ 371 (c)(1),
(2) Date: Aug. 25, 2021

(87) PCT Pub. No.: WO2020/200549
PCT Pub. Date: Oct. 8, 2020

(65) Prior Publication Data
US 2023/0026845 A1 Jan. 26, 2023

(30) Foreign Application Priority Data
Mar. 29, 2019 (EP) .................................... 19166426

(51) Int. Cl.
*H04W 56/00* (2009.01)
(52) U.S. Cl.
CPC .............................. *H04W 56/0015* (2013.01)
(58) Field of Classification Search
CPC ............................................... H04W 56/0015
See application file for complete search history.

(56) References Cited

U.S. PATENT DOCUMENTS

2015/0373624 A1 12/2015 Webb
2016/0285602 A1* 9/2016 Fang .................... H04L 5/0032
(Continued)

FOREIGN PATENT DOCUMENTS

CN 106464474 A 2/2017
EP 1249083 A2 10/2002
(Continued)

OTHER PUBLICATIONS

Ericsson, "Resynchronization signal for MTC", R1-1805849, May 12, 2018, 6 pages, 3GPP TSG-RAN WG1 Meeting #93, Busan, Korea, May 20-24, 2018.
(Continued)

*Primary Examiner* — Ajay Cattungal
(74) *Attorney, Agent, or Firm* — XSENSUS LLP

(57) ABSTRACT

A method of operating an infrastructure equipment forming part of a wireless communications network for transmitting data to or receiving data from a communications device. The method comprises providing a wireless access interface to form a first cell of the wireless communications network, the infrastructure equipment forming part of a radio access network of the wireless communications network, broadcasting a re-synchronisation signal, RSS, of the first cell, the RSS being configured to carry information which is detectable by the communications device for acquiring synchronisation with the infrastructure equipment, and broadcasting an indication of a position in time and frequency of an RSS of each of one or more neighbouring cells to the first, the RSSs of each of the one or more neighbouring cells being configured to carry information which is detectable by the communications device for performing measurements on the each of the one or more neighbouring cells.

20 Claims, 6 Drawing Sheets

(56) References Cited

U.S. PATENT DOCUMENTS

| | | | |
|---|---|---|---|
| 2016/0352613 | A1 | 12/2016 | Narayanan |
| 2017/0317806 | A1 | 11/2017 | Beale |
| 2018/0041323 | A1* | 2/2018 | Wang .................. H04B 7/0413 |
| 2018/0279239 | A1* | 9/2018 | Si ........................ H04W 56/001 |
| 2019/0159128 | A1* | 5/2019 | Lin ....................... H04W 68/00 |
| 2019/0229973 | A1* | 7/2019 | Sengupta ............. H04J 11/0079 |
| 2019/0268904 | A1* | 8/2019 | Miao .................... H04W 52/02 |
| 2019/0306812 | A1* | 10/2019 | Sengupta ............. H04L 5/0064 |
| 2021/0144043 | A1* | 5/2021 | Sengupta ............. H04J 11/0076 |
| 2021/0195457 | A1* | 6/2021 | Kim ..................... H04L 5/0023 |
| 2021/0306888 | A1* | 9/2021 | Kim ..................... H04W 24/08 |
| 2022/0217666 | A1* | 7/2022 | Åström ............ H04W 72/0446 |

FOREIGN PATENT DOCUMENTS

| | | |
|---|---|---|
| EP | 3031156 A1 | 6/2016 |
| WO | WO-2013083197 A1 | 6/2013 |
| WO | WO-2019021379 A1 | 1/2019 |

OTHER PUBLICATIONS

ZTE, "Remaining issues on resynchronization signal for MTC", R1-1806185, May 11, 2018, 4 pages, 3GPP TSG RAN WG1 Meeting #93, Busan, Korea, May 21-25, 2018.

International Search Report and Written Opinion mailed on Jun. 26, 2020, received for PCT Application PCT/EP2020/052986, Filed on Feb. 6, 2020, 20 pages.

Sony, "Considerations on using RSS for Measurements" 3GPP TSG RAN WG1 Meeting #94-bis, R1-1810655, Oct. 8-12, 2018, 3 pages.

Qualcomm Incorporated, "Use of RSS for RRM Measurements", 3GPP TSG-RAN WG1 Meeting #94bis, R1-1810922, Oct. 8-12, 2018, 2 pages.

Ericsson, "Signaling Configuration of RSS", 3GPP TSG-RAN WG2 Meeting #105, R2-1901182, Feb. 25-Mar. 1, 2019, 4 pages.

LG Electronics, "Discussion on the use of RSS for Measurement Improvement", 3GPP TSG RAN WG1 Meeting #94bis, R1-1810239, Oct. 8-12, 2018, 8 pages.

3GPP, "Evolved Universal Terrestrial Radio Access (E-UTRA); Radio Resource Control (RRC); Protocol Specification (Release 15)", 3GPP TS 36.331 V15.4.0, Dec. 2018, pp. 1-933.

Ericsson, "Use of RSS for Measurement Improvements in LTE-MTC", 3GPP TSG-RAN WG1 Meeting #96, R1-1901745, Feb. 25-Mar. 1, 2019, 6 pages.

3GPP, "Reply LS on RSS based Measurements Signaling", 3GPP TSG RAN WG1 Meeting #96, R1-1903659, Feb. 25-Mar. 1, 2019, 1 page.

Huawei et al., "New WID on Further NB-IoT Enhancements", #3GPP TSG RAN Meeting #75, R1-170852, Mar. 6-9, 2017, 6 pages.

Ericsson et al., "New WID on Rel-16 Enhancements for NB-IoT", 3GPP TSG RAN Meeting #80, RP-181451, Jun. 11-14, 2018, 4 pages.

Ericsson, "New WID on Rel-16 MTC Enhancements for LTE", 3GPP TSG RAN Meeting #80, RP-181450, Jun. 11-14, 2018, 4 pages.

Holma et al., "LTE for UMTS OFDMA and SC-FDMA Based Radio Access", John Wiley & Sons, 2009, pp. 25-27.

"Coverage Analysis of LTE-M Category-M1", White Paper, Version 1.0, Jan. 2017, pp. 1-20.

Ericsson et al., "New WID on Even further enhanced MTC for LTE", 3GPP TSG RAN Meeting #75, RP-170732, Mar. 6-9, 2017, 4 pages.

Ericsson, "Revised WID for Further Enhanced MTC for LTE", 3GPP TSG RAN Meeting #73, RP-161464, Sep. 19-22, 2016, 6 pages.

Huawei et al., "Revised Work Item Proposal: Enhancements of NB-IoT", 3GPP TSG RAN Meeting #73, RP-161901, Sep. 19-22, 2016, 8 pages.

* cited by examiner

METHODS, INFRASTRUCTURE EQUIPMENT AND COMMUNICATIONS DEVICE

CROSS-REFERENCE TO RELATED APPLICATIONS

The present application is based on PCT filing PCT/EP2020/052986, filed Feb. 6, 2020, which claims priority to EP 19166426.7, filed Mar. 29, 2019, the entire contents of each are incorporated herein by reference.

BACKGROUND

Field of Disclosure

The present disclosure relates to infrastructure equipment which form part of a radio access network of a mobile communications network, which are configured to transmit synchronisation signals to communications devices for the communications devices to synchronise with a wireless access interface provided by the radio network part of the wireless communications network in order to transmit or to receive data. The present technique also relates to communications devices configured to synchronise and perform measurements with a wireless communications network in order to transmit or to receive data via the wireless communications networks, and to methods and circuitry of the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE 4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. The IoT is further enhanced in 3GPP though the introduction of what is referred to here as A-MTC (Additional Machine Type Communications Enhancements) [5] and A-NB-IoT (Additional Enhancement for Narrowband Internet of Things) [6]. At least some devices making use of these technologies are expected to be low complexity and inexpensive devices requiring relatively infrequent communication of relatively low bandwidth data.

The increasing use of different types of communications devices associated with different traffic profiles gives rise to new challenges for efficiently handling communications in wireless telecommunications systems that need to be addressed, particularly, but not exclusively, in respect of low power devices.

SUMMARY OF THE DISCLOSURE

The present disclosure can help address or mitigate at least some of the issues discussed above as defined in the appended claims.

Embodiments of the present technique can provide a method of operating an infrastructure equipment forming part of a wireless communications network for transmitting data to or receiving data from a communications device. The method comprises providing a wireless access interface to form a first cell of the wireless communications network, the infrastructure equipment forming part of a radio access network of the wireless communications network, broadcasting a re-synchronisation signal, RSS, of the first cell, the RSS being configured to carry information which is detectable by the communications device for acquiring synchronisation with the infrastructure equipment, and broadcasting an indication of a position in time and frequency of an RSS of each of one or more neighbouring cells to the first cell, the RSSs of each of the one or more neighbouring cells being configured to carry information which is detectable by the communications device for performing measurements on the each of the one or more neighbouring cells. The RSS of the first cell and the RSSs of the one or more neighbouring cells are transmitted in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access, interface and the timing structure of the wireless access interface for transmission of the RSS of the first cell and the RSSs of the one or more neighbouring cells.

Embodiments of the present technique, which further relate to infrastructure equipment, communications devices, methods of operating communications devices and circuitry for communications devices and infrastructure equipment, allow for the saving of time, bandwidth and power at both the network and user equipment side, as fewer bits are required to convey the possible locations of serving cell and neighbouring cell RSSs, while a user equipment will not have to blind-decode all possible locations in order to successfully receive those RSSs.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
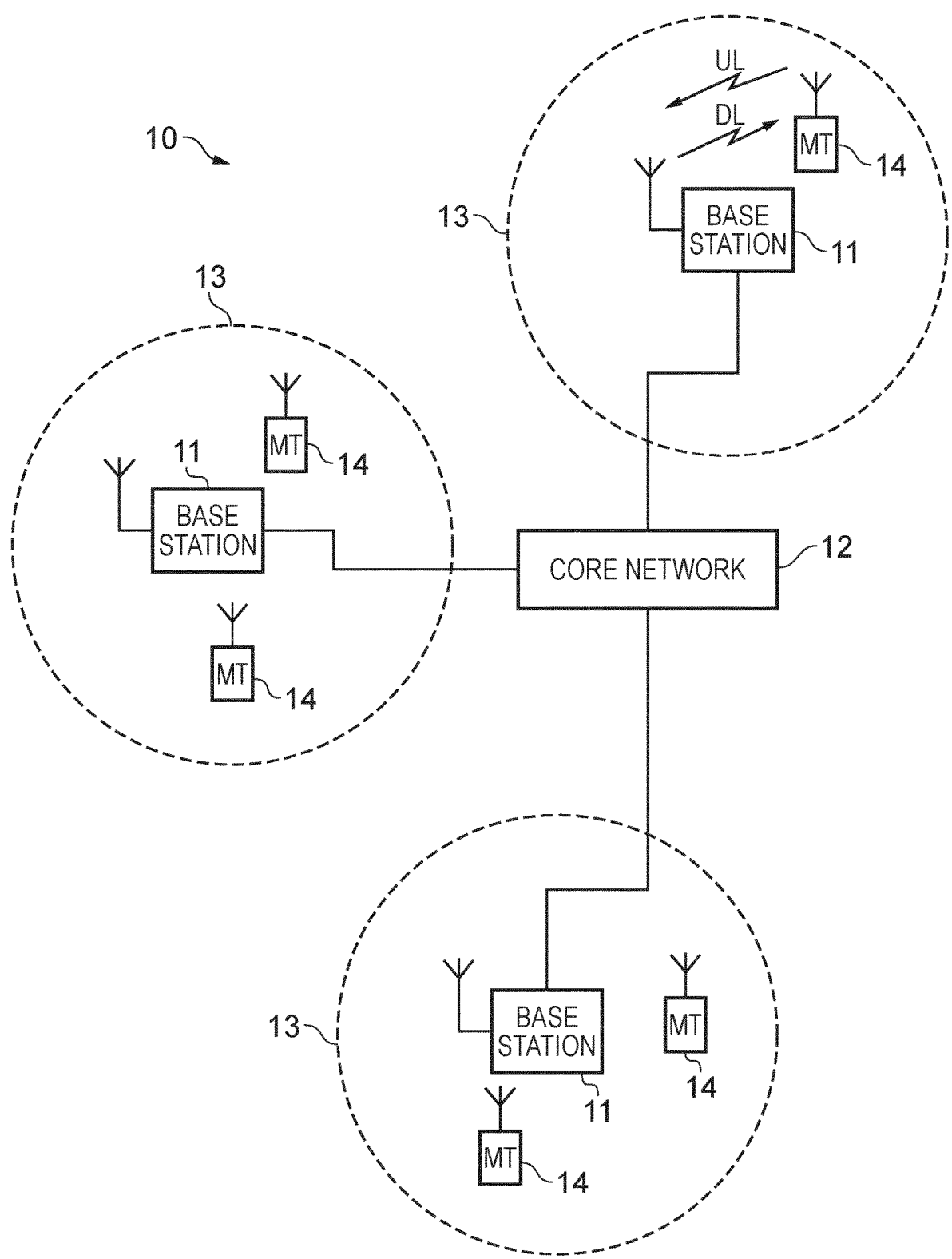
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein, Various elements of FIG. 1 and certain aspects of their respective modes of operation are well-known and defined in the relevant standards administered by the 3GPP® body, and also described in many books on the subject, for example, Holm. H. and Toskala A [7]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL) The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB);
Massive Machine Type Communications (mMTC);
Ultra Reliable & Low Latency Communications (URLLC); and
Enhanced Ultra Reliable & Low Latency Communications (eURLLC).

eMBB services are characterised by high capacity with a requirement to support up to 20 Gb/s. URLLC service requires that a packet at layer 2 is transmitted with a latency that is less than 1 ms or 0.5 ms with reliability of 99.999% to 99.9999%.

The elements of the wireless access network shown in FIG. 1 may be equally applied to a 5G new RAT configuration, except that a change in terminology may be applied as mentioned above.

Figure 2:
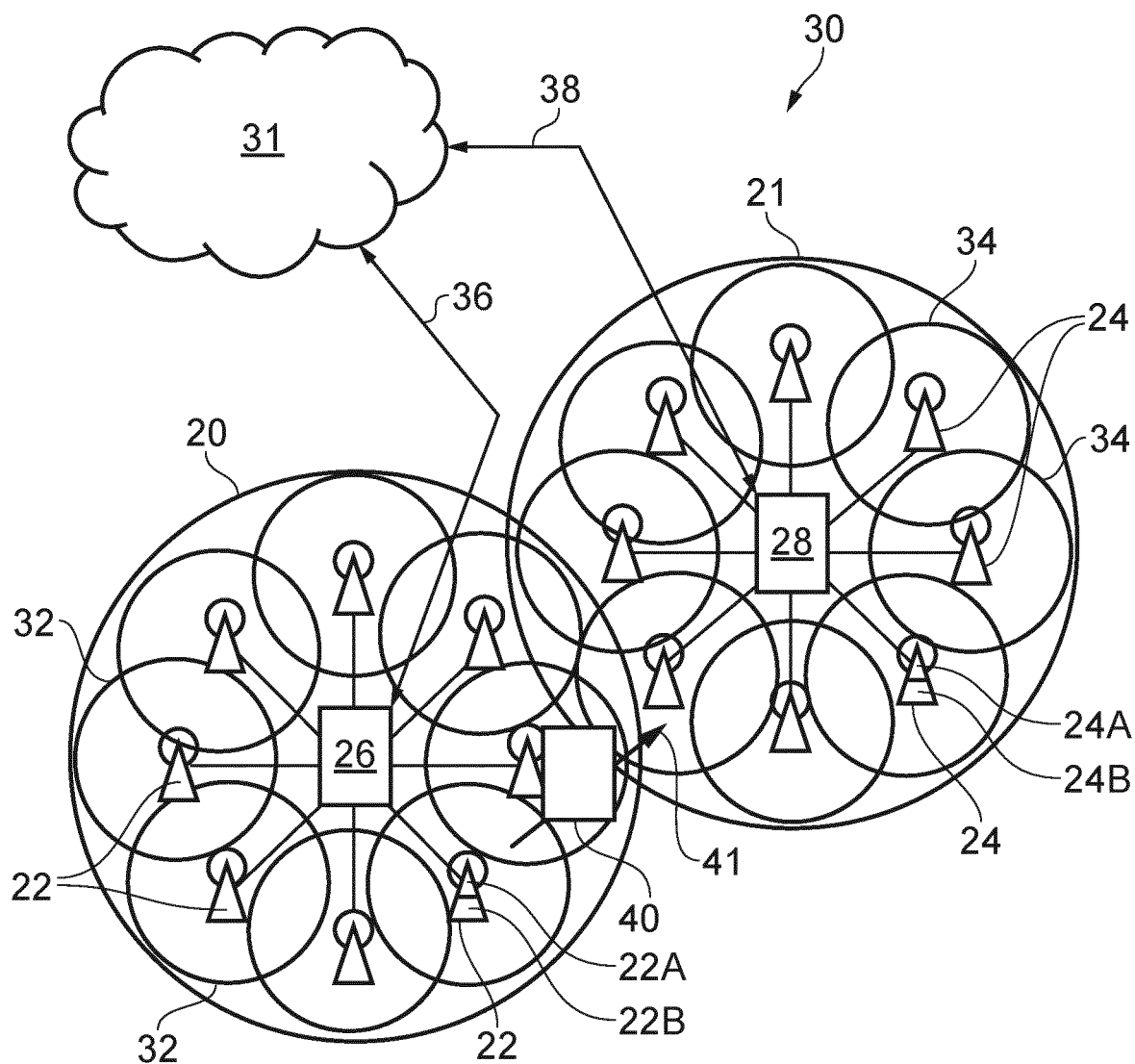
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22, However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Before a terminal can use a cell provided by a base station, the terminal is expected to carry out a series of steps. For example, a terminal may be in a situation where it has not yet achieved synchronisation after a long DRX (discontinuous reception) period or after having being switched on. A terminal would be expected to detect the cell and cell-ID using the Primary Synchronisation Signal (PSS) and Secondary Synchronisation Signal (SSS), and then receive the System Information (MIB) from the Physical Broadcast Channel (PBCH) and further System Information from the PDSCH. More specifically a terminal would have to first achieve time and frequency synchronisation with the cell, typically using the legacy primary synchronisation signals (PSS) and secondary synchronisation signals (SSS) emitted by the base station. Then, the terminal will decode the PBCH to acquire the MIB. The MIB contains amongst other things information for the terminal to acquire further System Information, namely SIB1-BR that is transmitted via the PDSCH. SIB1-BR contains scheduling information for acquiring the remaining System information portions (other SIBs).

As mentioned above, the cell ID is carried by the PSS in combination with the SSS. There are five hundred and four (504) possible cell IDs which are signalled by the PSS and the SSS. These are divided into three groups of one hundred and sixty eight (168) cell IDs. The PSS identifies one of the three groups and the SSS identifies the cell ID of the cell from one of the one hundred and sixty eight cell IDs. Since the PSS is carrying a smaller amount of information the communications resources allocated to the PSS can be more appropriately designed for detection by UEs at lower signal to notice ratios than the SSS. The UE may be therefore more likely to acquire synchronisation with the network.

As described above, it is expected future wireless communications networks will be expected to efficiently support communications with devices including reduced complexity devices or machine type communication (MTC) devices, which may be deployed for supporting the "The Internet of Things", and may typically be associated with the transmissions of relatively small amounts of data with relatively high latency tolerance.

Re-Synchronisation Signals (RSS)

One application of MTC is to provide periodic reports, e.g. for applications including sensors, utility meters, where the reports or readings are transmitted infrequently, e.g. once every several hours or days. Hence in order to save battery power, such devices likely operate mostly in idle mode where they operate with long DRX cycles. When an MTC UE is put into long DRX it will lose synchronisation with the network and hence upon waking up from DRX (e.g. to monitor the Paging Occasion or perform a RACH), the UE needs to re-synchronise to the network and perform system acquisition (read the MIB and SIB). In the legacy system, the UE uses the legacy LTE PSS and SSS to achieve synchronisation and thereafter, the UE acquires the PBCH and then SIB1-BR. For a UE operating in coverage enhanced mode, these re-synchronisation and system acquisition operations are notoriously slow as numerous repetitions are required to be able to decode the PBCH and PDSCH channels carrying the System Information, and hence the UE will consume a lot of battery power. Example estimates of the expected acquisition times for the PSS/SSS, PBCH (MIB) and SIB1 are shown in Table 1, which is reproduced from [8] for a deep coverage scenario. The length of time required to make an accurate measurement of neighbour cell signals depends on the density of those signals. The time required to make an accurate measurement of PSS/SSS is related to the acquisition time shown in Table 1. A significant length of time can also be required to measure RSRP using cell-specific reference signals (CRS).

TABLE 1

| Estimated 90% acquisition time at 164 dB MCL (maximum coupling loss) | |
| --- | --- |
| Channel | 90% Acquisition Time (ms) at 164 dB MCL |
| PSS/SSS | 850 |
| PBCH (MIB) | 250 |
| PDSCH (SIB1-BR) | 750 |

Figure 3:
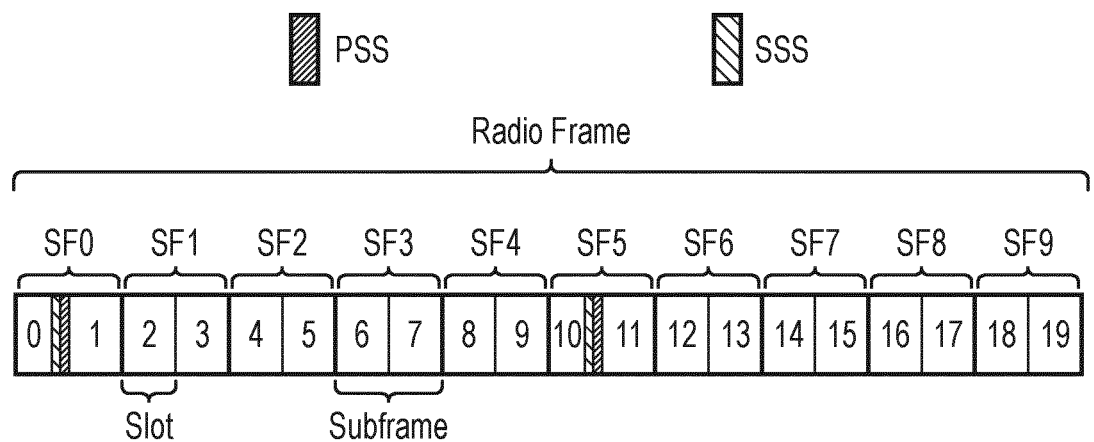
FIG. 3 schematically represents the transmission of the synchronisation signals in an FDD LTE system.

Legacy terminals (MTC terminals or otherwise) use the existing PSS/SSS which occupy only 1 OFDM symbol each and are transmitted sparsely; twice every radio frame. This is illustrated in FIG. 3 which represents the transmission of the synchronisation signals in an FDD LTE system, where it can be seen that the PSS and SSS each occupy a single OFDM symbol every 5 ms, where a radio frame is 10 ms. As illustrated by FIG. 3, boxes shown along a horizontal axis represent a transmission of ten subframes SF0 to SF9 in time which form a radio frame. Each of the sub-frames SF0 to SF9 is comprised of two slots as shown for example for one sub-frame SF3. There are therefore twenty slots numbered 0 to 19. As shown in FIG. 3 a PSS is transmitted in the last OFDM symbol of Slot 0 (Subframe 0) and the SSS is transmitted in Slot 10 (Subframe 5). Recognising this, in Rel-15 eMTC additional synchronisation signals known as Re-synchronisation Signals (RSS) were introduced that have longer duration, thereby helping the UE to reduce the time it takes re-synchronise to the network.

Figure 4:
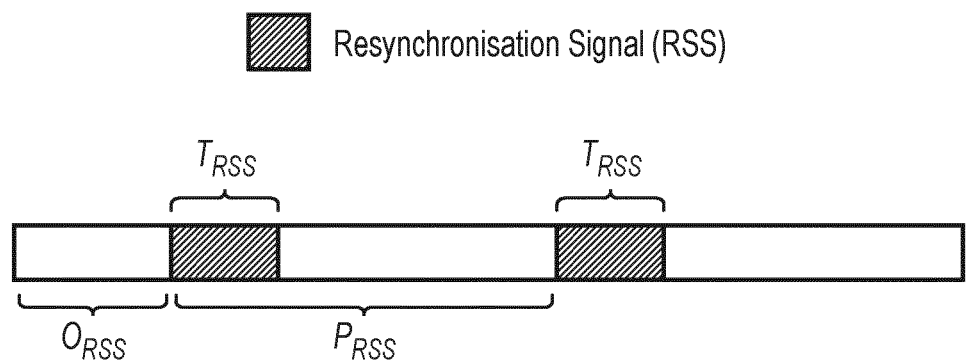
FIG. 4 schematically represents time domain parameters of a Re-synchronisation Signal (RSS)

The RSS is configured in the SIBs, where in the frequency domain it occupies any 2 consecutive PRBs in the system bandwidth. In the time domain it has a duration $T_{RSS}=\{8, 16, 32, 40\}$ ms, a periodicity of $P_{RSS}=\{160, 320, 640, 1280\}$ ms and starts with a time offset $O_{RSS}$ relative to the system frame as shown in FIG. 4.

In the legacy system, the UE performs neighbour cell measurements, such as RSRP measurements, using the neighbour cells' PSS/SSS or CRS (cell-specific reference signals) which, as described previously, is slow, thereby consuming a lot of UE battery power. The newly introduced RSS in Rel-15 cannot be used for neighbour cell measurements as the UE does not know the information/parameters of a neighbour cell's RSS. Therefore, in Rel-16 A-MTC, the use of RSS is extended for use in neighbour cell measurement. In order to facilitate this, the RSS parameters of each neighbour cell are signalled to the UE via the SIB. The following are the RSS parameters and the number of bits in each cell, according to [9]:

RSS duration, $T_{RSS}$: 2 bits: ENUMERATED {sf8, sf16, sf32, sf40};
RSS periodicity, $P_{RSS}$: 2 bits: ENUMERATED {ms160, ms320, ms640, ms1280};
RSS time offset, $O_{RSS}$: 5 bits: INTEGER (0 . . . 31);
RSS frequency location: 7 bits: INTEGER (0 . . . 98); and
RSS power offset relative to CRS: 2 bits: ENUMERATED {dB0, dB3, dB4dot8, dB6}.

Hence, in addition to signalling the serving cell's RSS parameters (18 bits), the serving cell also needs to signal 18 bits of RSS parameters for each neighbour cell. If there are 32 neighbours, this would require 576 bits, i.e. the signalling of neighbour cells' RSS parameters has very high overhead. Therefore, steps are required to reduce the signalling overhead and in [10], the following are agreed:

The RSS periodicity is made common across all cells in a carrier and hence it does not need to be signalled; and
It is expected that most of the other parameters are common across cells and for these parameters an efficient signalling method can be used. One such method, as proposed in [11], is to use 1 bit for each neighbour cell to indicate whether the RSS parameters are the same as those of the serving cell. For those neighbour cells that do not share the same RSS parameters, the full (18 bits) RSS parameters can be signalled for these neighbour cells. Since most cells share the same RSS parameters, this method would save signalling overhead.

Figure 5:
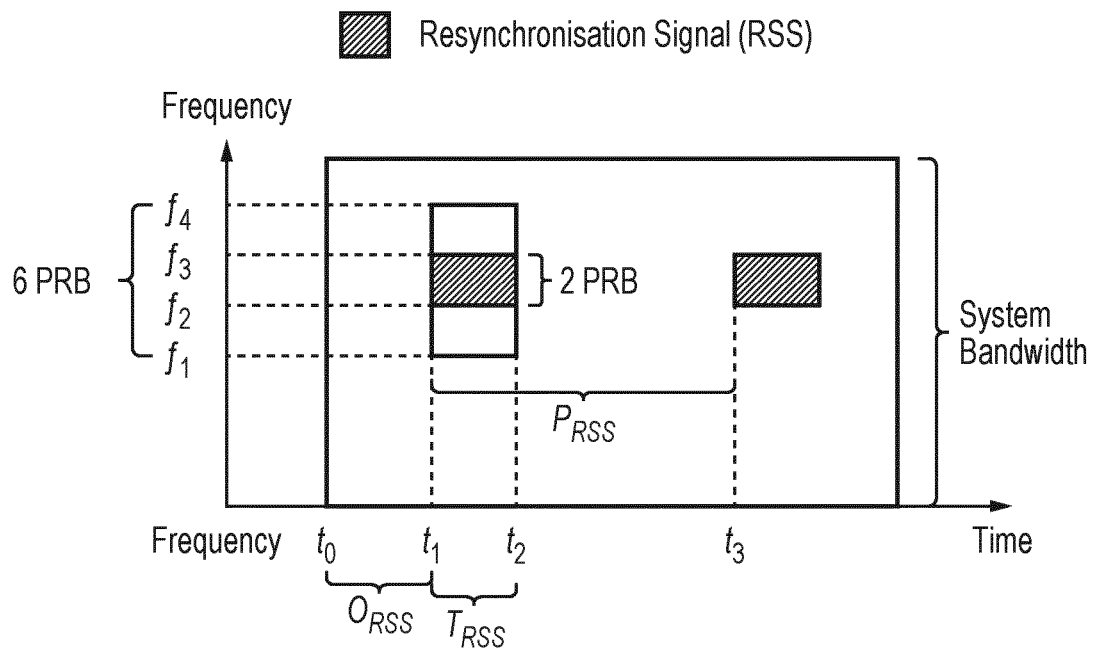
FIG. 5 illustrates an example of using a lower resolution for the RSS frequency location parameter.

It is further recognised that the two parameters that consume the most bits are the RSS time offset, $O_{RSS}$ (5 bits) and the RSS frequency location (7 bits). It should also be appreciated that it can be beneficial that these parameters are different among cells to avoid inter-cell interference and hence they may not always be common among cells in the network. Therefore there is good motivation to reduce the number of bits required to signal these two parameters. In [11], it is proposed to reduce the resolution of these two parameters thereby reducing the number of bits to signal the RSS time offset and RSS frequency location, for example according to the method shown in FIG. 5, where instead of pointing precisely which 2 PRBs (between $f_1$ and $f_3$) the RSS is located in, the network can indicate the RSS frequency location within 6 PRBs, i.e. between $f_1$ and $f_4$. The UE then has to search within these 6 PRBs, i.e. within $f_1$ to $f_4$ for the actual RSS frequency location. Similarly, a lower resolution can be used for the RSS time offset $O_{RSS}$ if the UE searches for the RSS across a time window. Once the UE has initially determined the location of the RSS in the neighbour cell, in the time and frequency domains, it then assumes that the RSS remains in that location, i.e. the UE does not need to search for the frequency and time location of the RSS every time the UE performs a neighbour measurement.

The use of lower resolution on the RSS frequency location and the RSS time offset would require the UE to blind decode for neighbour cells' RSS, which can be significant when there is a large number of neighbour cells, Another issue identified is if the RSS frequency or RSS time offset is changed but still falls within the granularity of the signalling window, the signalling cannot indicate this change. For example in FIG. 6, the RSS frequency location granularity is 6 PRBs. If the RSS frequency location changes from $f_2$ to $f_1$ (i.e. between $f_2$ and $f_3$ to between $f_1$ and $f_2$) then the RSS frequency location that can be signalled is not changed since it cannot indicate precisely which 2 PRBs the RSS is located in. This will result in the UE consistently measuring the wrong RSS frequency location. The figure shows that the RSS location changed from its previous location between $f_2$ and $f_3$ at time $t_1$ to its new current location between $f_1$ and $f_2$) at time $t_3$.

Neighbour Cells' RSS Parameters Signalling Reduction

Figure 7:
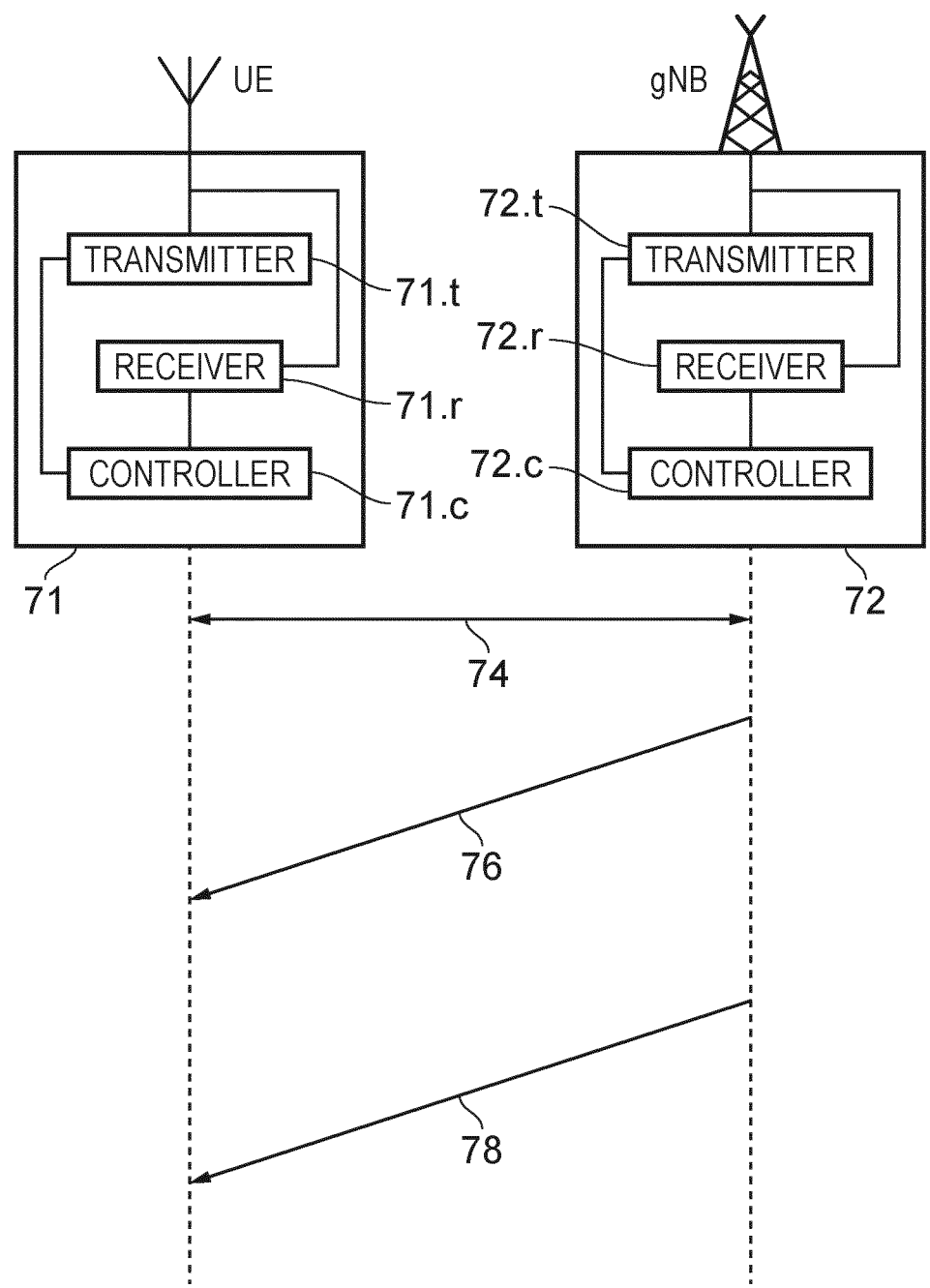
FIG. 7 is a part schematic representation, part message flow diagram of communications between a communications device and an infrastructure equipment of a wireless communications network in accordance with embodiments of the present technique.

FIG. 7 provides a part schematic representation, part message flow diagram of communications between a communications device or UE 71 and an infrastructure equipment or gNodeB 72 forming part of a radio access network of a wireless communications network in accordance with embodiments of the present technique. The communications device 71 comprises a transmitter (or transmitter circuitry) 71.t configured to transmit signals to the infrastructure equipment 72 via a wireless access interface 74 provided by the wireless communications network, the wireless access interface 74 forming a first cell of the wireless communications network, a receiver (or receiver circuitry) 71.r configured to receive signals from the infrastructure equipment 72 via the wireless access interface 74, and a controller (or controller circuitry) 71.c configured to control the transmitter circuitry 71.t and the receiver circuitry 71.r to transmit or to receive the signals. As can be seen in FIG. 7, the infrastructure equipment 72 also comprises a transmitter (or transmitter circuitry) 72.t configured to transmit signals to the communications device 71 (which may be one of a plurality of communications devices) via the wireless access interface 73, a receiver (or receiver circuitry) 72.r configured to receive signals from the communications device 71 via the wireless access interface 74, and a controller (or controller circuitry) 72.c configured to control the transmitter circuitry 72.t and the receiver circuitry 72.r to transmit or to receive the signals representing data. Each of the controllers 71.c, 72.c may be, for example, a microprocessor, a CPU, or a dedicated chipset, etc.

The controller circuitry 72.c of the infrastructure equipment 72 is configured in combination with the receiver circuitry 72.r and the transmitter circuitry 72.t of the infrastructure equipment 72 to broadcast 76 a re-synchronisation signal, RSS, of the first cell 71, the RSS being configured to carry information which is detectable by the communications device 71 for acquiring synchronisation with the infrastructure equipment 72, and to broadcast 78 an indication of a position in time and frequency of an RSS of each of one or more neighbouring cells to the first cell, the RSSs of each of the one or more neighbouring cells being configured to carry information which is detectable by the communications device 71 for performing measurements (and/or, in some examples, acquiring synchronisation with) on the each of the one or more neighbouring cells, wherein the RSS of the first cell and the RSSs of the one or more neighbouring cells are transmitted in one of a set of one or more permitted positions in time and frequency with respect to a timing structure of the wireless access interface 74 and a system bandwidth of the wireless access interface 74, the set of one or more permitted positions being fewer in number than a possible number of positions available within the system bandwidth of the wireless access interface 74 and the timing structure of the wireless access interface 74 for transmission of the RSS of the first cell and the RSSs of the one or more neighbouring cells.

Essentially, embodiments of the present technique propose that the number of possible RSS locations be restricted. This would reduce the number of bits required to signal the RSS time and frequency locations but allow some flexibility for each cell to use a different RSS location which is beneficial in mitigating inter-cell interference. Those skilled in the art would understand that the exact RSS locations are signalled and hence do not require the UE to blindly search for the actual RSS location (as in the lower resolution proposal made in [11]).

In some embodiments of the present technique therefore, only a subset of all possible RSS locations is allowed. This subset of locations can be RRC configured or specified in the specs, e.g. as a function of the system bandwidth, uniformly distributed across system bandwidth, function of the Cell ID (e.g. there are 4 permitted frequency locations and the exact PRB of these 4 frequency locations are dependent upon the Cell ID) or defined by a table of fixed locations for each system bandwidth. In other words, the set of one or more permitted positions are predetermined and known in advance to one or both of the infrastructure equipment and the communications device, the position of the RSS for the first cell and the neighbouring cells being identified as one of the permitted positions. Alternatively, the infrastructure equipment is configured to transmit, to the communications device, an indication of the set of one or more permitted positions. For example, in a 20 MHz system bandwidth with 100 PRBs, there are 99 possible locations, requiring 7 bits. If the number of locations is reduced to 4, then only 2 bits are required. Similarly the $O_{RSS}$ can have 32 different time offsets, requiring 5 bits, and this can be reduced to just 4 different time offsets requiring 2 bits. Hence the RSS frequency location and RSS time offset that originally required 12 bits is reduced to just 4 bits. The combination of the 4 frequency locations and 4 time offsets would provide an RSS reuse pattern of 16, that is, 16 neighbouring cells can use different RSS locations to avoid interfering with each other. It should be appreciated that the number of bits of signalling reduction here are just an example and these locations can be reduced to other numbers of bits. It should also be appreciated that although this example considers the RSS frequency location and RSS time offset, other parameters such as the RSS duration can also have their number of bits reduced. It will be appreciated by those skilled in the art that the time offset and frequency location can be jointly coded, e.g. 3 bits of signalling can be used to indicate 8 combinations of time offset and frequency location (and where each time offset and each frequency location can be different).

In some arrangements of embodiments of the present technique, the said restricted locations are such that the RSS frequency location may be a function of the Cell ID. In other words, the set of one or more permitted positions comprises only positions having one of an allowed set of frequency positions, and the infrastructure equipment determines the set of one or more permitted positions based on an identifier of the first cell. For example, there are 504 Cell IDs and 99 possible locations, hence an example implementation is RSS frequency location=Cell ID MOD(99). It should be appreciated that the value 99 used is just an example, and other numbers call be used, e.g. different system bandwidths would have different numbers of possible frequency locations and so other values and functions may be used in accordance with embodiments of the present technique.

In some arrangements of embodiments of the present technique, the said restricted locations are such that the RSS time offset $O_{RSS}$ is a function of the Cell ID. In other words, the set of one or more permitted positions comprises only positions having one of an allowed set of time slots, and the infrastructure equipment determines the set of one or more permitted positions based on an identifier of the first cell. For example, there are 32 possible time offsets and 504 Cell IDs and hence a MOD function such as Cell ID MOD 32 can be used. Once again this is just an example and other values and functions can be implemented.

It should be appreciated that the above two described arrangements can be combined, that is the RSS frequency location and the RSS time offsets are a function of the Cell ID. In these arrangements, in a case where the Cell ID may point to a specific frequency location and a specific time location (rather than a subset of two or more frequency or time locations) there is no need to signal any bits to indicate the RSS location since the Cell ID alone would indicate where the RSS is.

The above described arrangements can be combined in any manner. For example, the frequency location can be a function of the cell ID and the time location can be signalled by a reduced number of bits (e.g. the precise time offset of the RSS can be signalled by 2 bits, restricting the time offset to one of four possible values).

In some arrangements of embodiments of the present technique, a flexible indicator is used for each neighbour cell, where this said flexible indicator indicates that the said RSS locations are no longer restricted. In other words, the infrastructure equipment is configured to transmit, to the communications device, a flexible indicator for each of the one or more neighbouring cells, the flexible indicator indicating whether the RSS of the each of the one or more neighbouring cells will be broadcast in one of the set of one or more permitted positions or whether the RSS of the each of the one or more neighbouring cells will be broadcast in any one of the possible positions of the wireless access interface. For example, in Table 2 there are four neighbour cells {Cell 1, Cell 2, Cell 3, Cell 4} and for each cell, there is a flexible indicator. When the flexible indicator is off, i.e. "0", then the RSS location is restricted such that there are only 4 RSS frequency locations and 4 RSS time offsets (as signalled by 2 bits for the RSS frequency location and 2 bits for the RSS time offset). For Cell 3, the flexible indicator=1, thereby indicating that there is no restriction on the RSS location and hence the full 7 bits are used for the frequency location and the full 5 bits are used for time offset. It should be appreciated that embodiments of the present technique can of course include indicating a less restrictive RSS location instead of giving full flexibility. For example, if the flexible indicator=1, the number of bits for the RSS frequency location can be increased from 2 to 5. It should be appreciated by those skilled in the art that these example numbers are not restrictive, and any number of bits can be used.

TABLE 2

| | Flexible indicator | | | |
| --- | --- | --- | --- | --- |
| | Cell 1 | Cell 2 | Cell 3 | Cell 4 |
| Flexible indicator | 0 | 0 | 1 | 0 |
| RSS freq location (bits) | 2 | 2 | 7 | 2 |
| RSS time offset (bits) | 2 | 2 | 5 | 2 |

In some arrangements of embodiments of the present technique, a known number of bits is used to signal the frequency location and a known number of bits is used to signal the time offset. In other words, for each of the RSS of the first cell and the RSSs of the one or more neighbouring cells, the infrastructure equipment is configured to transmit, to the communications device as the indication of the set of one or more permitted positions, a first predetermined number of bits that indicate a position in frequency of the each of the RSS of the first cell and the RSSs of the one or more neighbouring cells, and to transmit, to the communications device as the indication of the set of one or more permitted positions, a second predetermined number of bits that indicate a position in time of the each of the RSS of the first cell and the RSSs of the one or more neighbouring cells. For example, 2 bits may be used to signal the frequency location and 2 bits may be used to signal the time offset. These known numbers of bits then effectively point to a row in a table that define the frequency location (or time location), as shown below in Table 3 (which is an example of a frequency location):

TABLE 3

Reduced number of bits indicating RSS location in frequency

| bits | Frequency location |
|---|---|
| 00 | $f_0$ |
| 01 | $f_1$ |
| 10 | $f_2$ |
| 11 | $f_3$ |

In some arrangements of embodiments of the present technique, one (or more) rows of this table indicate a different functionality. For example, the row indexed by bits "11" could indicate the following:
  Search for the frequency location of the RSS (in other words, for each of the RSS of the first cell and the RSSs of the one or more neighbouring cells, the infrastructure equipment is configured to transmit, to the communications device, a signal that indicates that the communications device should attempt to determine the set of one or more permitted positions); or
  Frequency location of the RSS is defined explicitly (e.g. using 7 bits) in further signalling (in other words, for each of the RSS of the first cell and the RSSs of the one or more neighbouring cells, the infrastructure equipment is configured to transmit, to the communications device, a signal that indicates that the communications device will receive a further indication of the position in which each of the RSS of the first cell and the RSSs of the one or more neighbouring cells will be broadcast).

In some arrangements, the restricted permitted RSS locations are partially signalled. For example, there can be 4 permitted RSS frequency locations, for example, two are located on the top half of the system bandwidth and the other two on the bottom half of the system bandwidth. The serving cell needs only signal a single bit to tell the UE which half of the system bandwidth the RSS is located in, and the UE searches for both locations in the upper part of the bandwidth. It should be appreciated that other arrangements of RSS location and partial signalling can be used. If the number of permitted RSS locations is very small, e.g. 2, then in an extreme implementation, the network does not even signal the RSS locations and the UE just blind decodes for them.

In some arrangements of embodiments of the present technique, whether a reduced number of bits is used to indicate neighbour RSS cell time and frequency locations depends on the number of neighbour cells. For example, if there are fewer than 8 neighbour cells, the RSS frequency and time locations are precisely signalled (using 7 and 5 bits respectively). If there are 8 neighbour cells or more, the RSS frequency and time locations are signalled with a reduced number of bits (e.g. 2 bits for the frequency location and 2 bits for the time location). In other words, the infrastructure equipment is configured to determine whether the number of the one or more neighbouring cells is above or below a predetermined threshold, and if the number of the one or more neighbouring cells is above the predetermined threshold, the infrastructure equipment is configured to determine that it should broadcast the RSS of the first cell and the indication of the position in time and frequency of the RSSs of the one or more neighbouring cells in one of the set of one or more permitted positions, or if the number of the one or more neighbouring cells is below the predetermined threshold, the infrastructure equipment is configured to determine that it should broadcast the RSS of the first cell and the indication of the position in time and frequency of the RSSs of the one or more neighbouring cells in any one of the possible positions of the wireless access interface.

In some arrangements of embodiments of the present technique, whether a reduced number of bits is used to indicate neighbour RSS cell frequency locations, where the number of bits depends on the system bandwidths of the neighbour cells. In other words, the infrastructure equipment is configured to determine, for the RSSs of each of the one or more neighbouring cells, the set of one or more permitted positions based on a system bandwidth of the each of the one or more neighbouring cells. For example, if one of the neighbour cells has a system bandwidth of 1.4 MHz (6 RBs), the RSS frequency location has only 5 possible locations. For such cells, the number of bits to early RSS frequency location can be reduced to 3 bits. In another example, if the largest neighbour cell bandwidth is 10 MHz (50 RBs), then the number of bits required to carry the RSS location of each neighbour cell would be a max of 6 bits (instead of 7 bits as in legacy system).

In some arrangements of embodiments of the present technique, when there is more than one frequency layer (e.g. one layer of cells operates at an 800 MHz carrier frequency and another layer of cells operates at a 2 GHz carrier frequency), the frequency and time locations of RSS used in one frequency layer are a function of the frequency and time locations of RSS used in another frequency layer. In other words, the first cell operates at a first carrier frequency, and one or more other cells of the wireless communications network operate at a second carrier frequency different to the first carrier frequency, and the set of one or more permitted positions used for cells of the first carrier frequency are related to a set of one or more permitted positions used for cells of the second carrier frequency. In an example the function is "equality": the frequency (relative to a known location in the system bandwidth) and tune locations used in the first frequency layer are the same as the frequency and time locations used in the second frequency layer. However, those skilled in the art would understand that any mathematical or logical function may be used here for such a purpose.

In some arrangements of embodiments of the present technique, the bits used to signal the frequency and time locations of the RSS indicate differences in the frequency and time locations of the RSS relative to the frequency and time location of the previous neighbour cell in the neighbour cell list. In other words, the first predetermined number of bits indicate a relative difference between a frequency position of the position of a most recently broadcast RSS of the one or more neighbouring cells and a frequency position of the position of a next RSS of the one or more neighbouring cells to be broadcast. The second predetermined number of bits indicates a relative difference between a time slot of the position of a most recently broadcast RSS of the one or more neighbouring cells and a time slot of the position of a next RSS of the one or more neighbouring cells to be broadcast. For example, the RSS frequency and time location of the first neighbour cell in the neighbour cell list is explicitly signalled, e.g. using 7 bits and 5 bits respectively. The second neighbour cell's RSS frequency location is signalled using 2 bits, indicating whether that neighbour cell has an RSS location that is 2 PRBs above the first neighbour's RSS location, 1 PRB above the first neighbour's RSS location, 1 PRB below the first neighbour's RSS location or 2 PRBs below the first neighbour's RSS location (or alternatively one of the indication is use to indicate that it is the same as the first neighbour's RSS location). In another example, the differential signalling is relative to the RSS location of the serving cell (rather than relative to the explicitly signalled location for the first neighbour cell in the list).

Figure 6:
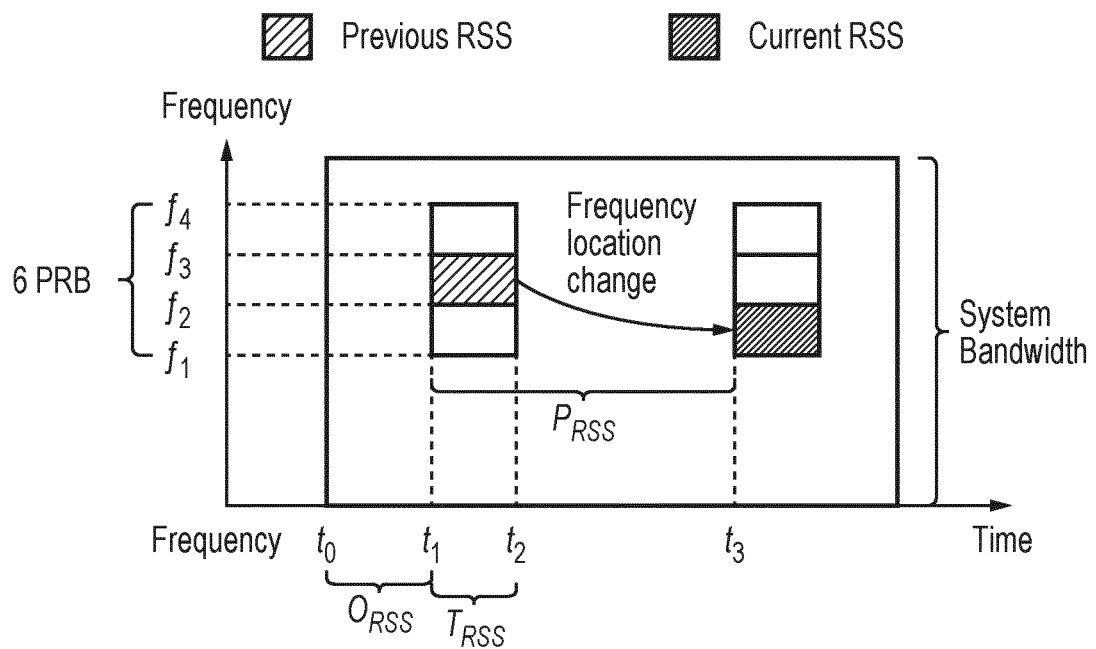
FIG. 6 illustrates an example of how the frequency location of an RSS may change within the granularity of the signalling of the frequency location.

As described in FIG. 6, one of the drawbacks of using a lower resolution on the RSS frequency location and RSS time offset is that the network cannot indicate a change in the RSS location if the change is within the signalling granularity. In some embodiments of the present technique therefore, whenever there is a system information (SI) change (i.e. a paging message indicating there is an SI change, especially a change on the neighbour cell RSS parameter or a change on the SI that carries the neighbour cell RSS parameter) the LIE performs a new search for the RSS locations for ALL its neighbour cells. Hence, for the case where the RSS location has changed but this is not reflected in the signalling, then this would force the UE to find the new RSS location. In other words, in such embodiments, the infrastructure equipment is configured to transmit, to the communications device, an indication of a plurality of subsets of one or more positions in time and frequency with respect to a timing structure of the wireless access interface and a system bandwidth of the wireless access interface in each of which one of a plurality of re-synchronisation signals, RSSs, may be transmitted, each of the plurality of subsets of positions being fewer in number than a possible number of positions available within the system bandwidth of the wireless access interface and the timing structure of the wireless access interface for transmission of the RSSs, to broadcast an RSS of the first cell in the one of the indicated plurality of subsets of positions for that RSS, and to broadcast an indication of a position in time and frequency of an RSS of each of one or more neighbouring cells to the first cell, the RSSs each being configured to carry information which is detectable by the communications device for acquiring synchronisation with the infrastructure equipment or for performing measurements on the neighbouring cell, to determine that, for at least one of the RSSs, there has been a change in system information associated with that RSS, and to transmit a search indicator to the communications device, in response to determining the change in the system information, the search indicator indicating that the communications device should search for next transmitted RSSs of one or more of either the first cell or the plurality of neighbouring cells to the first cell in all positions in the one of the indicated plurality of subsets of positions for that RSS.

In one arrangement this search indicator is the SI change indicator transmitted in the paging message.

Here, forcing the UE to perform a new RSS search on ALL neighbour cells can consume a lot of battery power and time. Hence, in some arrangements of embodiments of the present technique, a search indicator is used for each neighbour cell. This said search indicator would tell the UE whether the RSS location has changed thereby triggering the UE to perform a new search for the RSS location even if the signalling does not indicate that there is a change due to the coarse granularity. In other words, the search indicator is specific to either the first cell or one of the f neighbouring cells and indicates that the communications device should search for a next transmitted RSS of that first cell or one of the neighbouring cells in all positions in the one of the indicated plurality of subsets of positions for that RSS. An example implementation is shown in Table 4, where again there are four neighbour cells {Cell 1, Cell 2, Cell 3, Cell 4}, where if there is a change in the RSS frequency location or the RSS time offset, the search indicator is set to 1 otherwise it is set to 0.

TABLE 4

| Search indicator | | | | |
|---|---|---|---|---|
| | Cell 1 | Cell 2 | Cell 3 | Cell 4 |
| Search indicator | 0 | 1 | 1 | 1 |
| RSS freq location change | No | Yes | No | Yes |
| RSS time offset change | No | No | Yes | Yes |

In some arrangements of embodiments of the present technique, the said search indicator is a version indication, for example, if it is 1 bit, then a toggle in the search indicator would tell that the location has changed. In other words, the search indicator comprises a bit that indicates whether or not a position of the one of the first cell or one of the neighbouring cells to which the search indicator relates has changed.

In some arrangements of embodiments of the present technique, the said search indicator is part of the neighbor cell RSS parameter in the SIB. In other words, the search indicator is comprised within a system information block which comprises parameters of the RSS of the one of the first cell or one of the neighbouring cells to which the search indicator relates.

In some arrangements of embodiments of the present technique, the said search indicator is signalled in the paging message that indicates an SI change. In other words, the infrastructure equipment is configured to transmit a paging message to the communications device, the paging message indicating that the system information has changed, wherein the paging message comprises the search indicator.

Flow Diagram Representation

Figure 8:
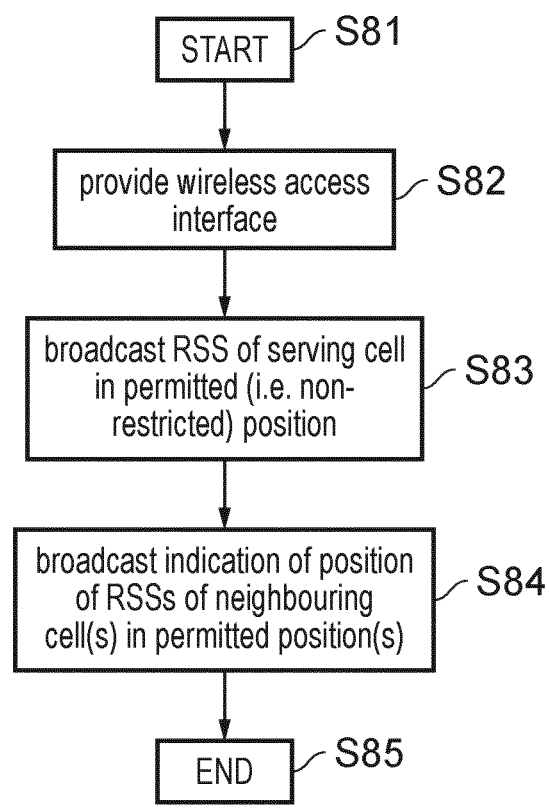
FIG. 8 shows a flow diagram illustrating a process of communications between a communications device and an infrastructure equipment in accordance with embodiments of the present technique.

FIG. 8 shows a flow diagram illustrating a method of operating an infrastructure equipment forming part of a wireless communications network for transmitting data to or receiving data from a communications device. The method begins in step S81. The method comprises, in step S82, providing a wireless access interface to form a first cell of the wireless communications network, the infrastructure equipment forming part of a radio access network of the wireless communications network. The process then comprises in step S83, broadcasting a re-synchronisation signal, RSS, of the first cell, the RSS being configured to carry information which is detectable by the communications device for acquiring synchronisation with the infrastructure equipment. In step S84, broadcasting an indication of a position in time and frequency of an RSS of each of one or more neighbouring cells to the first cell, the RSSs of each of the one or more neighbouring cells being configured to carry information which is detectable by the communications device for performing measurements on the each of the one or more neighbouring cells. The RSS of the first cell and the RSSs of the one or more neighbouring cells are transmitted in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells. The process ends in step S85.

Those skilled in the art would appreciate that the method shown by FIG. 8 may be adapted in accordance with embodiments of the present technique. For example, other preliminary, intermediate, or subsequent steps as described herein may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating an infrastructure equipment forming part of a wireless communications network for transmitting data to or receiving data from a communications device, the method comprising
 providing a wireless access interface to form a first cell of the wireless communications network, the infrastructure equipment forming part of a radio access network of the wireless communications network,
 broadcasting a re-synchronisation signal, RSS, the RSS being configured to carry information which is detectable by the communications device for acquiring synchronisation with the infrastructure equipment, and
 transmitting an indication of a position in time and frequency of an RSS of each of one or more neighbouring cells to the first cell, the RSSs of each of the one or more neighbouring cells being configured to carry information which is detectable by the communications device for performing measurements on the each of the one or more neighbouring cells,
 wherein the RSS of the first cell and the RSSs of the one or more neighbouring cells are transmitted in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells.

Paragraph 2. A method according to Paragraph 1, wherein the set of one or more permitted positions are predetermined and known in advance to one or both of the infrastructure equipment and the communications device, the position of the RSS for the first cell and the neighbouring cells being identified as one of the permitted positions.

Paragraph 3. A method according to Paragraph 1 or Paragraph 2, comprising
 transmitting, to the communications device, an indication of the set of one or more permitted positions.

Paragraph 4. A method according to Paragraph 3, comprising, for each of the RSS of first cell and the RSSs of the one or more neighbouring cells
 transmitting, to the communications device as the indication of the set of one or more permitted positions, a first predetermined number of bits that indicate a position in frequency of the each of the RSS of the first cell and the RSSs of the one or more neighbouring cells, and
 transmitting, to the communications device as the indication of the set of one or more permitted positions, a second predetermined number of bits that indicate a position in time of the each of the RSS of the first cell and the RSSs of the one or more neighbouring cells.

Paragraph 5. A method according to Paragraph 4, wherein the first predetermined number of bits indicate a relative difference between a frequency position of a most recently broadcast RSS of the one or more neighbouring cells and a frequency position of a next RSS of the one or more neighbouring cells to be broadcast.

Paragraph 6. A method according to Paragraph 4 or Paragraph 5, wherein the second predetermined number of bits indicate a relative difference between a time slot of the position of a most recently broadcast RSS of the one or more neighbouring cells and a time slot of the position of a next RSS of the one or more neighbouring cells to be broadcast.

Paragraph 7. A method according to any of Paragraphs 1 to 6, wherein the set of one or more permitted positions comprises only position having one of an allowed set of frequency positions, and
 wherein the infrastructure equipment determines the set of one or more permitted positions based on an identifier of the first cell.

Paragraph 8. A method according to any of Paragraphs 1 to 7, wherein the set of one or more permitted positions comprises only position having one of an allowed set of time slots, and
 wherein the infrastructure equipment determines the set of one or more permitted positions based on an identifier of the first cell.

Paragraph 9. A method according to any of Paragraphs 1 to 8, comprising
 transmitting, to the communications device, a flexible indicator for each of the one or more neighbouring cells, the flexible indicator indicating whether the RSS of the each of the one or more neighbouring cells will be broadcast in one of the set of one or more permitted positions or whether the RSS of the each of the one or more neighbouring cells will be broadcast in any one of the possible positions of the wireless access interface.

Paragraph 10. A method according to any of Paragraphs 1 to 9, comprising, for each of the RSS of the first cell and the RSSs of the one or more neighbouring cells
 transmitting, to the communications device, a signal that indicates that the communications device should attempt to determine the set of one or more permitted positions.

Paragraph 11. A method according to any of Paragraphs 1 to 10, comprising, for each of the RSS of the first cell and the RSSs of the one or more neighbouring cells transmitting, to the communications device, a signal that indicates that the communications device will receive a further indication of the position in which each of the RSS of the first cell and the RSSs of the one or more neighbouring cells will be broadcast.

Paragraph 12. A method according to any of Paragraphs 1 to 11, comprising determining whether the number of the one or more neighbouring cells is above or below a predetermined threshold, and if the number of the one or more neighbouring cells is above the predetermined threshold, determining that the infrastructure equipment should broadcast the RSS of the first cell and the indication of the position in time and frequency of the RSSs of the one or more neighbouring cells in one of the set of one or more permitted positions, or if the number of the one or more neighbouring cells is below the predetermined threshold, determining that the infrastructure equipment should broadcast the RSS of the first cell and the indication of the position in time and frequency of the RSSs of the one or more neighbouring cells in any one of the possible positions of the wireless access interface.

Paragraph 13. A method according to any of Paragraphs 1 to 12, comprising determining, for the RSSs of each of the one or more neighbouring cells, the set of one or more permitted positions based on a system bandwidth of the each of the one or more neighbouring cells.

Paragraph 14. A method according to any of Paragraphs 1 to 13, wherein the first cell operates at a first carrier frequency, and one or more other cells of the wireless communications network operate at a second carrier frequency different to the first carrier frequency, wherein the set of one or more permitted positions used for cells of the first carrier frequency are related to a set of one or more permitted positions used for cells of the second carrier frequency.

Paragraph 15. An infrastructure equipment forming part of a radio access network of a wireless communications network for transmitting data to or receiving data from a communications device, the infrastructure equipment comprising transmitter circuitry configured to trans it signals to the communications device via a wireless access interface provided by the wireless communications network, the wireless access interlace forming a first cell of the wireless communications network, receiver circuitry configured to receive signals from the communications device via the wireless access interface, and controller circuitry configured in combination with the transmitter circuitry to broadcast a re-synchronisation signal, RSS, of the first cell, the RSS being configured to carry information which is detectable by the communications device for acquiring synchronisation with the infrastructure equipment, and to broadcast an indication of a position in time and frequency of an RSS of each of one or more neighbouring cells to the first cell, the RSSs of each of the one or more neighbouring cells being configured to carry information which is detectable by the communications device for performing measurements on the each of the one or more neighbouring cells, wherein the RSS of the first cell and the RSSs of the one or more neighbouring cells are transmitted in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells.

Paragraph 16. Circuity for an infrastructure equipment forming part of a radio access network of a wireless communications network for transmitting data to or receiving data from a communications device, the infrastructure equipment comprising transmitter circuitry configured to transmit signals to the communications device via a wireless access interface provided by the wireless communications network, the wireless access interface forming a first cell of the wireless communications network, receiver circuitry configured to receive signals from the communications device via the wireless access interface, and controller circuitry configured in combination with the transmitter circuitry to broadcast a re-synchronisation signal, RSS, of the first cell, the RSS being configured to carry information which is detectable by the communications device for acquiring synchronisation with the infrastructure equipment, and to broadcast an indication of a position in time and frequency of an RSS of each of one or more neighbouring cells to the first cell, the RSSs of each of the one or more neighbouring cells being configured to carry information which is detectable by the communications device for performing measurements on the each of the one or more neighbouring; cells, wherein the RSS of the first cell and the RSSs of the one or more neighbouring cells are transmitted in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells.

Paragraph 17. A method of operating a communications device for transmitting data to or receiving data from an infrastructure equipment forming part of a radio access network of a wireless communications network via a wireless access interface forming a first cell of the wireless communications network, the method comprising receiving a re-synchronisation Signal, RSS, of the first cell from the infrastructure equipment, the RSS being configured to carry information which is detectable by the communications device for acquiring synchronisation with the infrastructure equipment, and receiving an indication of a position in time and frequency of an RSS of each of one or more neighbouring cells to the first cell from the infrastructure equipment, the RSSs of each of the one or more neighbouring cells being configured to carry information which is detectable by the communications device for performing measurements on the each of the one or more neighbouring cells, wherein the RSS of the first cell and the RSSs of the one or more neighbouring cells are received in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells.

Paragraph 18. A method according to Paragraph 17, wherein the set of one or more permitted positions are predetermined and known in advance to one or both of the infrastructure equipment and the communications device, the position of the RSS for the first cell and the neighbouring cells being identified as one of the permitted positions.

Paragraph 19. A method according to Paragraph 17 or Paragraph 18, comprising receiving, from the infrastructure equipment, an indication of the set of one or more permitted positions.

Paragraph 20. A method according to Paragraph 10, comprising, for each of the RSS of the first cell and the RSSs of the one or more neighbouring cells
- receiving, from the infrastructure equipment as the indication of the set of one or more permitted positions, a first predetermined number of bits that indicate a position in frequency of the each of the RSS of the first cell and the RSSs of the one or more neighbouring cells, and
- receiving, from the infrastructure equipment as the indication of the set of one or more permitted positions, a second predetermined number of bits that indicate a position in time of the each of the RSS of the first cell and the RSSs of the one or more neighbouring cells.

Paragraph 21. A method according to Paragraph 20, wherein the first predetermined number of bits indicate a relative difference between a frequency position of a most recently received RSS of the one or more neighbouring cells and a frequency position of a next RSS of the one or more neighbouring cells to be received.

Paragraph 22. A method according to Paragraph 20 or Paragraph 21, wherein the second predetermined number of bits indicate a relative difference between a time slot of the position of a most recently received RSS of the one or more neighbouring cells and a time slot of the position of a next RSS of the one or more neighbouring cells to be received.

Paragraph 23. A method according to any of Paragraphs 17 to 22, wherein the set of one or more permitted positions comprises only position having one of an allowed set of frequency positions, and
- wherein the communications device determines the set of one or more permitted positions based on an identifier of the first cell.

Paragraph 24. A method according to any of Paragraphs 17 to 23, wherein the set of one or more permitted positions comprises only position having one of an allowed set of time slots, and
- wherein the communications device determines the set of one or more permitted positions based on an identifier of the first cell.

Paragraph 25. A method according to any of Paragraphs 17 to 24, comprising
- receiving, from the infrastructure equipment, a flexible indicator for each of the one or more neighbouring cells, the flexible indicator indicating whether the RSS of the each of the one or more neighbouring cells will be received in one of the set of one or more permitted positions or whether the RSS of the each of the one or more neighbouring cells will be received in any one of the possible positions of the wireless access interface.

Paragraph 26. A method according to any of Paragraphs 17 to 25, comprising, for each of the RSS of the first cell and the RSSs of the one or more neighbouring cells
- receiving, from the infrastructure equipment, a signal that indicates that the communications device should attempt to determine the set of one or more permitted positions.

Paragraph 27. A method according to any of Paragraphs 17 to 26, comprising, for each of the RSS of the first cell and the RSSs of the one or more neighbouring cells
- receiving, from the infrastructure equipment, a signal that indicates that the communications device will receive a further indication of the position in which each of the RSS of the first cell and the RSSs of the one or more neighbouring cells will be received.

Paragraph 28. A method according to any of Paragraphs 17 to 27, comprising
- determining whether the number of the one or more neighbouring cells is above or below a predetermined threshold, and
- if the number of the one or more neighbouring cells is above the predetermined threshold, determining that the communications device will receive the RSS of the first cell and the indication of the position in time and frequency of the RSSs of the one or more neighbouring cells in one of the set of one or more permitted positions, or
- if the number of the one or more neighbouring cells is below the predetermined threshold, determining that the communications device will receive the RSS of the first cell and the indication of the position in time and frequency of the RSSs of the one or more neighbouring cells in any one of the possible positions of the wireless access interface.

Paragraph 29. A method according to any of Paragraphs 17 to 28, comprising
- determining, for the RSSs of each of the one or more neighbouring cells, the set of one or more permitted positions based on a system bandwidth of the each of the one or more neighbouring cells.

Paragraph 30. A method according to any of Paragraphs 17 to 29, wherein the first cell operates at a first carrier frequency, and one or more other cells of the wireless communications network operate at a second carrier frequency different to the first carrier frequency, wherein
- the set of one or more permitted positions used for cells of the first carrier frequency are related to a set of one or more permitted positions used for cells of the second carrier frequency.

Paragraph 31. A communications device for transmitting data to or receiving data from an infrastructure equipment forming part of a radio access network of a wireless communications network, the communications device comprising
- transmitter circuitry configured to transmit signals to the infrastructure equipment via a wireless access interface provided by the wireless communications network, the wireless access interface forming a first cell of the wireless communications network, receiver circuitry configured to receive signals from the infrastructure equipment via the wireless access interface, and controller circuitry configured in combination with the receiver circuitry and the transmitter circuitry to receive a re-synchronisation signal, RSS, of the first cell from the infrastructure equipment, the RSS being configured to carry information which is detectable by the communications device for acquiring synchronisation with the infrastructure equipment, and to receive an indication of a position in time and frequency of an RSS of each of one or more neighbouring cells to the first cell from the infrastructure equipment, the RSSs of each of the one or more neighbouring cells being configured to carry information which is detectable by the communications device for performing measurements on the each of the one or more neighbouring cells, wherein the RSS of the first cell and the RSSs of the one or more neighbouring cells are received in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells.

Paragraph 32. Circuitry for a communications device for transmitting data to or receiving data from an infrastructure equipment forming part of a radio access network of a wireless communications network, the communications device comprising transmitter circuitry configured to transmit signals to the infrastructure equipment via a wireless access interface provided by the wireless communications network, the wireless access interface forming a first cell of the wireless communications network, receiver circuitry configured to receive signals from the infrastructure equipment via the wireless access interface, and controller circuitry configured in combination with the receiver circuitry and the transmitter circuitry to receive a re-synchronisation signal, RSS, of the first cell from the infrastructure equipment, the RSS being configured to carry information which is detectable by the communications device for acquiring synchronisation with the infrastructure equipment, and to receive an indication of a position in time and frequency of an RSS of each of one or more neighbouring cells to the first cell from the infrastructure equipment, the RSSs of each of the one or more neighbouring cells being configured to carry information which is detectable by the communications device for performing measurements on the each of the one or more neighbouring cells, wherein the RSS of the first cell and the RSSs of the one or more neighbouring cells are received in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells.

Paragraph 33. A method of operating an infrastructure equipment forming part of a wireless communications network for transmitting data to or receiving data from a communications device, the method comprising providing a wireless access interface to form a first cell of the wireless communications network, the infrastructure equipment forming part of a radio access network of the wireless communications network, transmitting, to the communications device, an indication of a plurality of subsets of one or more positions in time and frequency with respect to a timing structure of the wireless access interface and a system bandwidth of the wireless access interface in each of which one of a plurality of re-synchronisation signals, RSSs, may be transmitted, each of the plurality of subsets of positions being fewer in number than a possible number of positions available within the system bandwidth of the wireless access interface and the timing structure of the wireless access interface for transmission of the RSSs, broadcasting an RSS of the first cell in the one of the indicated plurality of subsets of positions for that RSS, and broadcasting an indication of a position in time and frequency of an RSS of each of one or more neighbouring cells to the first cell, the RSSs each being configured to carry: information which is detectable by the communications device for acquiring synchronisation with the infrastructure equipment or for performing measurements on the neighbouring cell, determining that, for at least one of the RSSs, there has been a change in system information associated with that RSS, and transmitting a search indicator to the communications device, in response to determining the change in the system information, the search indicator indicating that the communications device should search for next transmitted RRSs of one or more of either the first cell or the plurality of neighbouring cells to the first cell in all positions in the one of the indicated plurality of subsets of positions for that RSS.

Paragraph 34. A method according to Paragraph 33, wherein the search indicator is implicitly indicated by an indication of a system information change Paragraph 35. A method according to Paragraph 33 or Paragraph 34, wherein the search indicator is specific to either the first cell or one of the neighbouring cells and indicates that the communications device should search for a next transmitted RSS of that first cell or one of the neighbouring cells in all positions in the one of the indicated plurality of subsets of positions for that RSS.

Paragraph 36. A method according to Paragraph 35, wherein the search indicator comprises a bit that indicates whether or not a position of the one of the first cell or one of the neighbouring cells to which the search indicator relates has changed.

Paragraph 37. A method according to Paragraph 35 or Paragraph 36, wherein the search indicator is comprised within a system information block which comprises parameters of the RSS of the one of the first cell or one of the neighbouring cells to which the search indicator relates.

Paragraph 38. A method according to any of Paragraphs 33 to 37, comprising transmitting a paging message to the communications device, the paging message indicating that the system information has changed, wherein the paging message comprises the search indicator.

Paragraph 39. An infrastructure equipment forming part of a radio access network of a wireless communications network for transmitting data to or receiving data from a communications device, the infrastructure equipment comprising transmitter circuitry configured to transmit signals to the communications device via a wireless access interface provided by the wireless communications network, the wireless access interface forming a first cell of the wireless communications network, receiver circuitry configured to receive signals from the communications device via the wireless access interface, and controller circuitry configured in combination with the transmitter circuitry to transmit, to the communications device, an indication of a plurality of subsets of one or more positions in time and frequency with respect to a timing structure of the wireless access interface and a system bandwidth of the wireless access interface in each of which one of a plurality of re-synchronisation signals, RSSs, may be transmitted, each of the plurality of subsets of positions being fewer in number than a possible number of positions available within the system bandwidth of the wireless access interface and the timing structure of the wireless access interface for transmission of the RSSs, to broadcast an RSS of the first cell in the one of the indicated plurality of subsets of positions for that RSS, and to broadcast an indication of a position in time and frequency of an RSS of each of one or more neighbouring cells to the first cell, the RSSs each being configured to carry information which is detectable by the communications device for acquiring synchronisation with the infrastructure equipment or for performing measurements on the neighbouring cell, to determine that, for at least one of the RSSs, there has been a change in system information associated with that RSS, and to transmit a search indicator to the communications device, in response to determining the change in the system information, the search indicator indicating that the communications device should search for next transmitted RRSs of one or more of either the first cell or the neighbouring cells to the first cell in all positions in the one of the indicated plurality of subsets of positions for that RSS.

Paragraph 40. Circuitry for an infrastructure equipment forming part of a radio access network of a wireless communications network for transmitting data to or receiving data from a communications device, the infrastructure equipment comprising transmitter circuitry configured to transmit signals to the communications device via a wireless access interface provided by the wireless communications network, the wireless access interface forming a first cell of the wireless communications network, receiver circuitry configured to receive signals from the communications device via the wireless access interface, and controller circuitry configured in combination with the transmitter circuitry to transmit, to the communications device, an indication of a plurality of subsets of one or more positions in time and frequency with respect to a timing structure of the wireless access interface and a system bandwidth of the wireless access interface in each of which one of a plurality of re-synchronisation signals, RSSs, may be transmitted, each of the plurality of subsets of positions being fewer in number than a possible number of positions available within the system bandwidth of the wireless access interface and the timing structure of the wireless access interface for transmission of the RSSs, to broadcast an RSS of the first cell in the one of the indicated plurality of subsets of positions for that RSS, and to broadcast an indication of a position in time and frequency of an RSS of each of one or more neighbouring cells to the first cell, the RSSs each being configured to carry information which is detectable by the communications device for acquiring synchronisation with the infrastructure equipment or for performing measurements on the neighbouring cell, to determine that, for at least one of the RSSs, there has been a change in system information associated with that RSS, and to transmit a search indicator to the communications device, in response to determining the change in the system information, the search indicator indicating that the communications device should search for next transmitted RRSs of one or more of either the first cell or the neighbouring cells to the first cell in all positions in the one of the indicated plurality of subsets of positions for that RSS.

Paragraph 41. A method of operating a communications device for transmitting data to or receiving data from an infrastructure equipment forming part of a radio access network of a wireless communications network via a wireless access interface forming a first cell of the wireless communications network, the method comprising receiving, from the infrastructure equipment, an indication of a plurality of subsets of one or more positions in time and frequency with respect to a timing structure of the wireless access interface and a system bandwidth of the wireless access interface in each of which one of a plurality of re-synchronisation signals, RSSs, may be received, each of the plurality of subsets of positions being fewer in number than a possible number of positions available within the system bandwidth of the wireless access interface and the timing structure of the wireless access interface for reception of the RSSs, receiving an RSS of the first cell from the infrastructure equipment in the one of the indicated plurality of subsets of positions for that RSS, and receiving an indication of a position in time and frequency of an RSS of each of one or more neighbouring cells to the first cell from the infrastructure equipment, the RSSs each being configured to carry information which is detectable by the communications device for acquiring synchronisation with the infrastructure equipment or for performing measurements on the neighbouring cell, and receiving a search indicator from the infrastructure equipment indicating that the communications device should search for next transmitted RRSs of one or more of either the first cell or the neighbouring cells to the first cell in all positions in the one of the indicated plurality of subsets of positions for that RSS.

Paragraph 42. A method according to Paragraph 41, wherein the search indicator is implicitly indicated by an indication of a system information change Paragraph 43. A method according to Paragraph 41 or Paragraph 42, wherein the search indicator is specific to either the first cell or one of the neighbouring cells and indicates that the communications device should search for a next transmitted RSS of that first cell or one of the neighbouring cells in all positions in the one of the indicated plurality of subsets of positions for that RSS.

Paragraph 44, A method according to Paragraph 43, wherein the search indicator comprises a bit that indicates whether or not a position of the one of the first cell or one of the neighbouring cells to which the search indicator relates has changed.

Paragraph 45. A method according to Paragraph 43 or 44, wherein the search indicator is comprised within a system information block which comprises parameters of the RSS of the one of the first cell or one of the neighbouring cells to which the search indicator relates.

Paragraph 46. A method according to any of Paragraphs 41 to 45, comprising
receiving a paging message from the infrastructure equipment, the paging message indicating that system information associated with at least one of the RSSs has changed, wherein the paging message comprises the search indicator.

Paragraph 47, A communications device for transmitting data to or receiving data from an infrastructure equipment forming part of a radio access network of a wireless communications network, the communications device comprising
transmitter circuitry configured to transmit signals to the infrastructure equipment via a wireless access interface provided by the wireless communications network, the wireless access interface forming a first cell of the wireless communications network,
receiver circuitry configured to receive signals from the infrastructure equipment via the wireless access interface, and
controller circuitry configured in combination with the receiver circuitry and the transmitter circuitry
to receive, from the infrastructure equipment, an indication of a plurality of subsets of one or more positions in time and frequency with respect to a timing structure of the wireless access interface and a system bandwidth of the wireless access interface in each of which one of a plurality of re-synchronisation signals, RSSs, may be received, each of the plurality of subsets of positions being fewer in number than a possible number of positions available within the system bandwidth of the wireless access interface and the timing structure of the wireless access interface for reception of the RSSs,
to receive an RSS of the first cell from the infrastructure equipment in the one of the indicated plurality of subsets of positions for that RSS, and to receive an indication of a position time and frequency of an RSS of each of one or more neighbouring cells to the first cell from the infrastructure equipment, the RSSs each being configured to carry information which is detectable by the communications device for acquiring synchronisation with the infrastructure equipment or for performing measurements on the neighbouring cell, and
to receive a search indicator from the infrastructure equipment indicating that the communications device should search for next transmitted RRSs of one or more of either the first cell or the neighbouring cells to the first cell in all positions in the one of the indicated plurality of subsets of positions for that RSS.

Paragraph 48, Circuitry for a communications device for transmitting data to or receiving data from an infrastructure equipment forming part of a radio access network of a wireless communications network, the communications device comprising
transmitter circuitry configured to transmit signals to the infrastructure equipment via a wireless access interface provided by the wireless communications network, the wireless access interface forming a first cell of the wireless communications network,
receiver circuitry configured to receive signals from the infrastructure equipment via the wireless access interface, and
controller circuitry configured in combination with the receiver circuitry and the transmitter circuitry
to receive, from the infrastructure equipment, an indication of a plurality of subsets of one or more positions in time and frequency with respect to a timing structure of the wireless access interface and a system bandwidth of the wireless access interface in each of which One of a plurality of re-synchronisation signals, RSSs, may be received, each of the plurality of subsets of positions being fewer in number than a possible number of positions available within the system bandwidth of the wireless access interface and the timing structure of the wireless access interface for reception of the RSSs.
to receive an RSS of the first cell from the infrastructure equipment in the one of the indicated plurality of subsets of positions for that RSS, and to receive an indication of a position in time and frequency of an RSS of each of one or more neighbouring cells to the first cell from the infrastructure equipment, the RSSs each being configured to carry information which is detectable by the communications device for acquiring synchronisation with the infrastructure equipment or for performing measurements on the neighbouring cell, and
to receive a search indicator from the infrastructure equipment indicating that the communications device should search for next transmitted RRSs of one or more of either the first cell or the neighbouring cells to the first cell in all positions in the one of the indicated plurality of subsets of positions for that RSS.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WM for Further Enhanced MTC for LTE," Ericsson, RAN #73.
[2] RP-161901, "Revised work item proposal: Enhancements of NB-IoT", Huawei, RAN #73.
[3] RP-170732, "New WID on Even further enhanced MTC for LTE," Ericsson, Qualcomm, RAN #75.
[4] RP-170852, "New WID on Further NB-IoT enhancements," Huawei, HiSilicon, Neul, RAN #75.
[5] RP-181450, "New WID on Rel-16 MTC enhancements for LTE," Ericsson, RAN #80.
[6] RP-181451, "New WID on Rel-16 enhancements for NB-IoT" Ericsson, Huawei, RAN #80.
[7] Holma H. and Toskala A, "LTE for UMTS OFDMA and SC-TDMA based radio access", John Wiley and Sons, 2009.
[8] White Paper "Coverage Analysis of LTE-M Category-M1" Sierra Wireless, Ericsson, Altair, Sony, Virtuosys, AT&T, Verizon, Sequans, Orange, KDDI, Nokia, DoCoMo, KT, SoftBank, Telkomsel, SK Telecom, 2016.
[9] 3GPP TS 36.331, "Evolved Universal Terrestrial Radio Access (E-UTRA); Radio Resource Control (RRC); Protocol specification", 3GPP.
[10] R1-1903659, "Reply LS on RSS based measurements signalling," RAN1, RAN1 #96.
[11] R1-1901745, "Use of RSS for measurement improvements in LTE-MTC," Ericsson, RAN1 #96.

What is claimed is:

1. A method of operating an infrastructure equipment forming part of a wireless communications network for transmitting data to or receiving data from a communications device, the method comprising:
providing a wireless access interface to form a first cell of the wireless communications network, the infrastructure equipment forming part of a radio access network of the wireless communications network,
broadcasting a re-synchronisation signal (RSS), the RSS being configured to carry information which is detectable by the communications device for acquiring synchronisation with the infrastructure equipment, and
transmitting an indication of a position in time and frequency of an RSS of each of one or more neighbouring cells to the first cell, the RSSs of each of the one or more neighbouring cells being configured to carry information which is detectable by the communications device for performing measurements on the each of the one or more neighbouring cells,
wherein the RSS of the first cell and the RSSs of the one or more neighbouring cells are transmitted in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells, and
the set of one or more permitted positions comprises positions having at least one of an allowed set of frequency positions and an allowed set of time slots.

2. The method according to claim 1, wherein the set of one or more permitted positions are predetermined and known in advance to one or both of the infrastructure equipment and the communications device, the position of the RSS for the first cell and the neighbouring cells being identified as one of the permitted positions.

3. The method according to claim 1, comprising:
transmitting, to the communications device, an indication of the set of one or more permitted positions.

4. The method according to claim 3, comprising, for each of the RSS of the first cell and the RSSs of the one or more neighbouring cells;
transmitting, to the communications device as the indication of the set of one or more permitted positions, a first predetermined number of bits that indicate a position in frequency of the each of the RSS of the first cell and the RSSs of the one or more neighbouring cells, and
transmitting, to the communications device as the indication of the set of one or more permitted positions, a second predetermined number of bits that indicate a position in time of the each of the RSS of the first cell and the RSSs of the one or more neighbouring cells.

5. The method according to claim 4, wherein the first predetermined number of bits indicate a relative difference between a frequency position of a most recently broadcast RSS of the one or more neighbouring cells and a frequency position of a next RSS of the one or more neighbouring cells to be broadcast.

6. The method according to claim 4, wherein the second predetermined number of bits indicate a relative difference between a time slot of the position of a most recently broadcast RSS of the one or more neighbouring cells and a time slot of the position of a next RSS of the one or more neighbouring cells to be broadcast.

7. The method according to claim 1, wherein the set of one or more permitted positions comprises only position having one of an allowed set of frequency positions, and
wherein the infrastructure equipment determines the set of one or more permitted positions based on an identifier of the first cell.

8. The method according to claim 1, wherein the set of one or more permitted positions comprises only position having one of an allowed set of time slots, and
wherein the infrastructure equipment determines the set of one or more permitted positions based on an identifier of the first cell.

9. The method according to claim 1, comprising:
transmitting, to the communications device, a flexible indicator for each of the one or more neighbouring cells, the flexible indicator indicating whether the RSS of the each of the one or more neighbouring cells will be broadcast in one of the set of one or more permitted positions or whether the RSS of the each of the one or more neighbouring cells will be broadcast in any one of the possible positions of the wireless access interface.

10. The method according to claim 1, comprising, for each of the RSS of the first cell and the RSSs of the one or more neighbouring cells;
transmitting, to the communications device, a signal that indicates that the communications device should attempt to determine the set of one or more permitted positions.

11. The method according to claim 1, comprising, for each of the RSS of the first cell and the RSSs of the one or more neighbouring cells;

transmitting, to the communications device, a signal that indicates that the communications device will receive a further indication of the position in which each of the RSS of the first cell and the RSSs of the one or more neighbouring cells will be broadcast.

12. The method according to claim 1, comprising:
determining whether the number of the one or more neighbouring cells is above or below a predetermined threshold, and
if the number of the one or more neighbouring cells is above the predetermined threshold, determining that the infrastructure equipment should broadcast the RSS of the first cell and the indication of the position in time and frequency of the RSSs of the one or more neighbouring cells in one of the set of one or more permitted positions, or
if the number of the one or more neighbouring cells is below the predetermined threshold, determining that the infrastructure equipment should broadcast the RSS of the first cell and the indication of the position in time and frequency of the RSSs of the one or more neighbouring cells in any one of the possible positions of the wireless access interface.

13. The method according to claim 1, comprising:
determining, for the RSSs of each of the one or more neighbouring cells, the set of one or more permitted positions based on a system bandwidth of the each of the one or more neighbouring cells.

14. The method according to claim 1, wherein the first cell operates at a first carrier frequency, and one or more other cells of the wireless communications network operate at a second carrier frequency different to the first carrier frequency, wherein
the set of one or more permitted positions used for cells of the first carrier frequency are related to a set of one or more permitted positions used for cells of the second carrier frequency.

15. A method of operating a communications device for transmitting data to or receiving data from an infrastructure equipment forming part of a radio access network of a wireless communications network via a wireless access interface forming a first cell of the wireless communications network, the method comprising:
receiving a re-synchronisation signal (RSS), RSS, of the first cell from the infrastructure equipment, the RSS being configured to carry information which is detectable by the communications device for acquiring synchronisation with the infrastructure equipment, and
receiving an indication of a position in time and frequency of an RSS of each of one or more neighbouring cells to the first cell from the infrastructure equipment, the RSSs of each of the one or more neighbouring cells being configured to carry information which is detectable by the communications device for performing measurements on the each of the one or more neighbouring cells,
wherein the RSS of the first cell and the RSSs of the one or more neighbouring cells are received in one of a set of one or more permitted positions in time and frequency with respect to a timing structure of the wireless access interface and a system bandwidth of the wireless access interface, the set of one or more permitted positions being fewer in number than a possible number of positions available within the system bandwidth of the wireless access interface and the timing structure of the wireless access interface for transmission of the RSS of the first cell and the RSSs of the one or more neighbouring cells, and
the set of one or more permitted positions comprises positions having at least one of an allowed set of frequency positions and an allowed set of time slots.

16. The method according to claim 15, wherein the set of one or more permitted positions are predetermined and known in advance to one or both of the infrastructure equipment and the communications device, the position of the RSS for the first cell and the neighbouring cells being identified as one of the permitted positions.

17. A method of operating an infrastructure equipment forming part of a wireless communications network for transmitting data to or receiving data from a communications device, the method comprising:
providing a wireless access interface to form a first cell of the wireless communications network, the infrastructure equipment forming part of a radio access network of the wireless communications network,
transmitting, to the communications device, an indication of a plurality of subsets of one or more positions in time and frequency with respect to a timing structure of the wireless access interface and a system bandwidth of the wireless access interface in each of which one of a plurality of re-synchronisation signals (RSSs) may be transmitted, each of the plurality of subsets of positions being fewer in number than a possible number of positions available within the system bandwidth of the wireless access interface and the timing structure of the wireless access interface for transmission of the RSSs,
broadcasting an RSS of the first cell in the one of the indicated plurality of subsets of positions for that RSS, and broadcasting an indication of a position in time and frequency of an RSS of each of one or more neighbouring cells to the first cell, the RSSs each being configured to carry information which is detectable by the communications device for acquiring synchronisation with the infrastructure equipment or for performing measurements on the neighbouring cell,
determining that, for at least one of the RSSs, there has been a change in system information associated with that RSS, and
transmitting a search indicator to the communications device, in response to determining the change in the system information, the search indicator indicating that the communications device should search for next transmitted RRSs of one or more of either the first cell or the plurality of neighbouring cells to the first cell in all positions in the one of the indicated plurality of subsets of positions for that RSS.

18. The method according to claim 17, wherein the search indicator is implicitly indicated by an indication of a system information change.

19. The method according to claim 17, wherein the search indicator is specific to either the first cell or one of the neighbouring cells and indicates that the communications device should search for a next transmitted RSS of that first cell or one of the neighbouring cells in all positions in the one of the indicated plurality of subsets of positions for that RSS.

20. The method according to claim 17, comprising:
transmitting a paging message to the communications device, the paging message indicating that the system information has changed, wherein the paging message comprises the search indicator.

\* \* \* \* \*